United States Patent
Gwak

(10) Patent No.: US 8,629,915 B2
(45) Date of Patent: Jan. 14, 2014

(54) DIGITAL PHOTOGRAPHING APPARATUS, METHOD OF CONTROLLING THE SAME, AND COMPUTER READABLE STORAGE MEDIUM

(75) Inventor: Jin-pyo Gwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 13/022,747

(22) Filed: Feb. 8, 2011

(65) Prior Publication Data

US 2011/0221920 A1 Sep. 15, 2011

(30) Foreign Application Priority Data

Mar. 11, 2010 (KR) ........................ 10-2010-0021844

(51) Int. Cl.
*H04N 5/228* (2006.01)

(52) U.S. Cl.
USPC ......... 348/222.1; 348/335; 348/340; 348/345

(58) Field of Classification Search
USPC .............. 348/222.1, 335, 340, 345, 348, 241, 348/243, 246, 247
See application file for complete search history.

(56) References Cited

U.S. PATENT DOCUMENTS

2009/0005112 A1* 1/2009 Sorek et al. ................. 455/556.2
2009/0257122 A1* 10/2009 Hara ............................. 359/507

FOREIGN PATENT DOCUMENTS

KR 1020090106748 A 10/2009

* cited by examiner

*Primary Examiner* — Yogesh Aggarwal
(74) *Attorney, Agent, or Firm* — Drinker Biddle & Reath LLP

(57) ABSTRACT

A digital photographing apparatus, a method of controlling the same, and a computer readable storage medium, the method including obtaining a first image captured from an optical signal received via a first optical system; obtaining a second image captured from an optical signal received via a second optical system; calculating a first histogram from the first image, where the first histogram represents a frequency distribution according to values of pixels of the first image; calculating a second histogram from the second image, where the second histogram represents a frequency distribution according to values of pixels of the second image; comparing the first histogram and the second histogram with each other; and determining whether an obstacle is present on at least one of the first and second optical systems, based on the result of comparison.

20 Claims, 14 Drawing Sheets

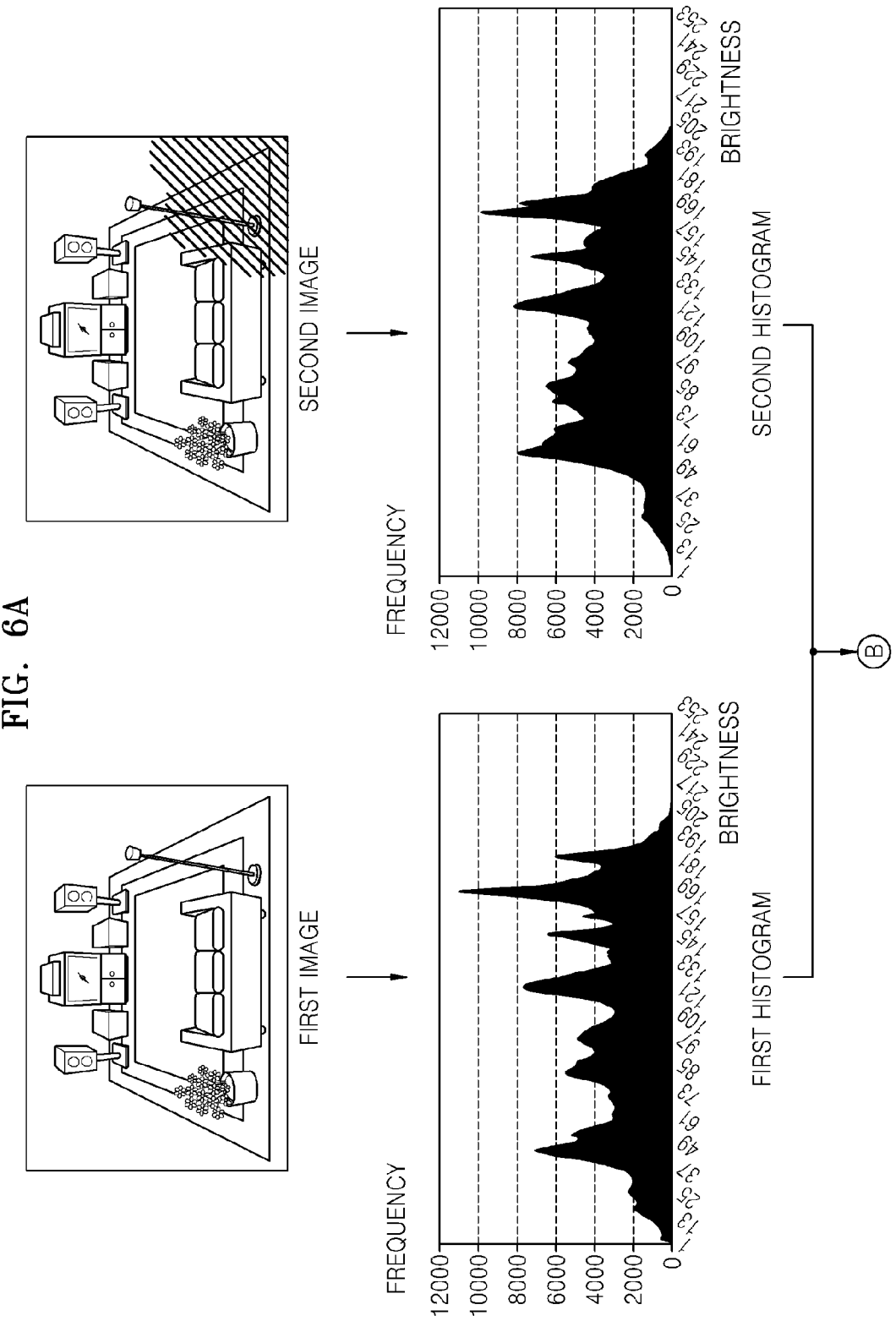

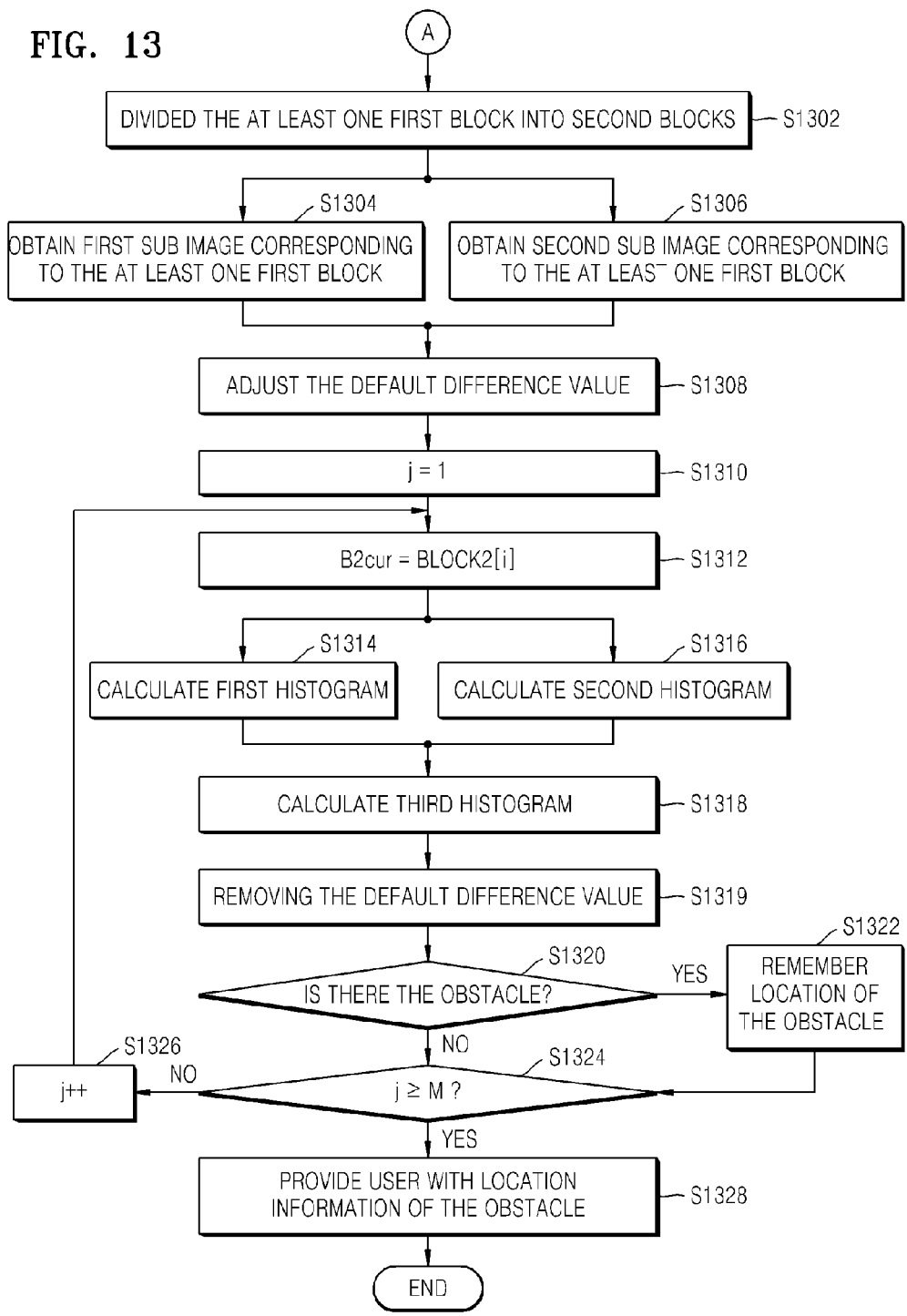

DIGITAL PHOTOGRAPHING APPARATUS, METHOD OF CONTROLLING THE SAME, AND COMPUTER READABLE STORAGE MEDIUM

CROSS-REFERENCE TO RELATED PATENT APPLICATION

This application claims the benefit of Korean Patent Application No. 10-2010-0021844, filed on Mar. 11, 2010, in the Korean Intellectual Property Office, the entire disclosure of which is incorporated herein by reference.

BACKGROUND

1. Field of the Invention

One or more embodiments of the invention relate to a digital photographing apparatus that determines whether an obstacle is present on an optical system of the apparatus, a method of controlling the same, and a computer readable storage medium having recorded thereon computer readable instructions for performing the method.

2. Description of the Related Art

In digital photographing apparatuses, an optical signal from a subject that passes through an optical system having a lens, an aperture, and so on is transformed into an electrical signal via an imaging device in order to capture an image of the subject. The optical system focuses the optical signal on the imaging device and adjusts the amount and depth of light. Obstacles on the optical system may lower the quality of captured images, but detecting obstacles on the optical system may be difficult or inconvenient for a photographer to detect.

SUMMARY

Therefore, there is a need in the art for a digital photographing apparatus that includes a first optical system and a second optical system disposed on different optical axes and allowing light to pass there through, computer readable storage medium have recorded thereon computer readable instructions for performing a method of controlling the digital photographing apparatus, and a method of controlling the digital photographing apparatus, the method including obtaining a first image captured from an optical signal received via the first optical system; obtaining a second image captured from an optical signal received via the second optical system; calculating a first histogram from the first image, where the first histogram represents a frequency distribution according to values of pixels of the first image; calculating a second histogram from the second image, where the second histogram represents a frequency distribution according to values of pixels of the second image; comparing the first histogram and the second histogram with each other; and determining whether an obstacle is present on at least one of the first and second optical systems, based on the result of comparison.

The values of the pixels may indicate brightness.

The method may include if an obstacle is present on at least one of the first and second optical systems, informing a user that an obstacle is present.

Comparing of the first histogram and the second histogram with each other may include calculating a third histogram by calculating absolute values of differences between values of the first and second histograms, and the determining of whether an obstacle is present may include determining whether an obstacle is present on at least one of the first and second optical systems, based on the third histogram.

The determining of whether an obstacle is present may include determining whether an obstacle is present by determining whether a representative value of the third histogram is greater than a first reference value.

The determining of whether an obstacle is present may include determining that an obstacle is present when an integral of values of the third histogram that are greater than a first reference value is greater than a second reference value.

The method may include determining the first reference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution.

Comparing of the first histogram and the second histogram with each other may include determining a default difference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution; calculating a third histogram from the values of the pixels of the first and second images, where the third histogram represents absolute values of differences between values of the first and second histograms; and calculating an adjusted third histogram by removing the default difference value from the values of the third histogram, wherein the determining of whether an obstacle is present comprises determining whether an obstacle is present on at least one of the first and second optical systems, based on the adjusted third histogram.

The calculating of the first histogram, the calculating of the second histogram, the comparing of the first histogram and the second histogram with each other, and the determining of whether an obstacle is present may be performed in units of first blocks of the first and second image, and the method may include if an obstacle is present, providing a user with location information of an obstacle by providing the user with location information of at least one of the first blocks in which an obstacle is present.

If an obstacle is present, the first and second histograms may be calculated from the at least one first block in units of second blocks, the first and second histograms may be compared with each other, and whether an obstacle is present on at least one of the first and second optical systems may be determined based on the result of comparison, where the second blocks are smaller than the at least one first block, and the providing a user with location information of an obstacle may provide the user with location information of at least one of the second blocks in which an obstacle is present.

A digital photographing apparatus is provided. The digital photographing apparatus including a first optical system and a second optical system disposed on different optical axes and allowing light to pass there through; at least one imaging device configured to transform optical signals passing respectively through the first and second optical systems into electrical signals; a first image obtaining unit configured to obtain a first image captured from the optical signal received via the first optical system; a second image obtaining unit configured to obtain a second image captured from the optical signal received via the second optical system; a first histogram calculation unit configured to calculate a first histogram from the first image, where the first histogram represents a frequency distribution according to values of pixels of the first image; a second histogram calculation unit configured to calculate a second histogram from the second image, where the second histogram represents a frequency distribution according to value of pixels of the second image; a comparison unit configured to compare the first histogram and the second histogram with each other; and an obstacle determination unit configured to determine whether an obstacle is present on at least one of the first and second optical systems, based on the result of comparison.

The values of the pixels may indicate brightness.

An obstacle information providing unit may be configured to inform a user that an obstacle is present when an obstacle is present on at least one of the first and second optical systems.

The comparator may include a third histogram calculation unit configured to calculate a third histogram by calculating absolute values of differences between values of the first and second histograms, and wherein the obstacle determination unit may be configured to determine whether an obstacle is present on at least one of the first and second optical systems, based on the third histogram.

The obstacle determination unit is configured to determine whether an obstacle is present by determining whether a representative value of the third histogram is greater than a first reference value.

The obstacle determination unit may be configured to determine that an obstacle is present when an integral of values of the third histogram that are greater than a first reference value is greater than a second reference value.

The obstacle determination unit may be configured to determine the first reference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution.

The comparator may include a default value obtaining unit configured to determine a default difference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution; a third histogram calculation unit configured to calculate a third histogram from the values of the pixels of the first and second images, where the third histogram represents absolute values of differences between values of the first and second histograms; and an adjusted third histogram calculation unit configured to calculate an adjusted third histogram by removing the default difference value from the values of the third histogram, wherein the obstacle determination unit may determine whether an obstacle is present on at least one of the first and second optical systems, based on the adjusted third histogram.

Operations of the first histogram calculation unit, the second histogram calculation unit, the comparator, and the obstacle determination unit may be performed in units of first blocks of the first and second images, and the digital photographing apparatus may include an obstacle information providing unit configured to provide a user with location information of an obstacle by providing the user with location information of at least one of the first blocks in which an obstacle is present, when an obstacle is present.

If an obstacle is present, the first and second histogram obtaining units calculate the first and second histograms from the at least one first block in units of second blocks divided from the at least one first block, respectively, and wherein if an obstacle is present, the comparison unit may compare the first and second histograms with each other with respect to the at least one first block in units of the second blocks, and wherein the obstacle information providing unit may be configured to provide a user with location information of at least one of the second blocks in which an obstacle is present.

A non-transitory computer readable storage medium is provided. The non-transitory computer readable storage medium may have recorded thereon a computer instructions for controlling a digital photographing apparatus that includes first and second optical systems disposed on different optical axes to allow light to pass there through, the computer instructions including a code for obtaining a first image captured from an optical signal received via the first optical system; a code for obtaining a second image captured from an optical signal received via the second optical system; a code for calculating a first histogram from the first image, where the first histogram represents a frequency distribution according to values of pixels of the first image; a code for calculating a second histogram from the second image, where the second histogram represents a frequency distribution according to values of pixels of the second image; a code for comparing the first histogram and the second histogram with each other; and a code for determining whether an obstacle is present on at least one of the first and second optical systems, based on the result of comparison.

The values of the pixels may indicate brightness.

The computer instructions may include a code for informing a user that an obstacle is present, if an obstacle is present on at least one of the first and second optical systems.

The code for comparing the first histogram and the second histogram with each other may include a code for calculating a third histogram by calculating absolute values of differences between values of the first and second histograms, and the code for determining whether an obstacle is present comprises a code for determining whether the obstacle is present on at least one of the first and second optical systems, based on the third histogram.

The code for determining whether an obstacle is present may include a code for determining whether an obstacle is present by determining whether a representative value of the third histogram is greater than a first reference value.

The code for determining whether the obstacle is present may include a code for determining that an obstacle is present when an integral of values of the third histogram that are greater than a first reference value is greater than a second reference value.

The computer instructions may include a code for determining the first reference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution.

The code for the comparing of the first histogram and the second histogram with each other may include a code for determining a default difference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution; a code for calculating a third histogram from the values of the pixels of the first and second images, where the third histogram represents absolute values of differences between values of the first and second histograms; and a code for calculating an adjusted third histogram by removing the default difference value from the values of the third histogram, wherein the code for determining whether an obstacle is present, determines whether an obstacle is present on at least one of the first and second optical systems, based on the third histogram.

The code for calculating the first histogram, the code for calculating the second histogram, the code for comparing the first histogram and the second histogram with each other, and the code for determining whether an obstacle is present, may be executed in units of first blocks of the first and second image, and wherein the computer instructions may include a code for providing a user with location information of an obstacle by providing the user with location information of at least one of the first blocks in which an obstacle is present, if an obstacle is present.

If an obstacle is present, the codes for calculating the first histogram and the second histogram from the at least one first block, respectively, the code for comparing the first and second histograms with each other, and the code for determining whether an obstacle is present may be executed in units of second blocks divided from the at least one first block, and the code for providing a user with the location information of an obstacle provides the user with location information of at least one of the second blocks in which an obstacle is present.

A method of controlling a digital photographing apparatus that includes a first optical system and a second optical system disposed on different optical axes and allowing light to pass into the digital photographing apparatus, the method including obtaining a first image captured from an optical signal received via the first optical system; obtaining a second image captured from an optical signal received via the second optical system; comparing the first image and the second image; and determining whether an obstacle is present on at least one of the first and second optical systems, based on the result of the comparison.

BRIEF DESCRIPTION OF THE DRAWINGS

The above and other features and advantages of the present invention will become more apparent by describing in detail exemplary embodiments thereof with reference to the attached drawings in which:

FIGS. 6A and 6B illustrate a process of calculating first to third histograms from first and second images when an obstacle exists on a second optical system, according to an embodiment of the invention;

FIGS. 12 and 13 are flowcharts illustrating a method of controlling a digital photographing apparatus, according to another embodiment of the invention.

DETAILED DESCRIPTION

The following description and appended drawings are not intended to restrict the scope of the invention and are provided to help understand the invention. Here, well-known functions or constructions that are obvious to those of ordinary skill in the art may not be described.

The scope of the invention should be determined as defined in the claims and their equivalents. The specific terms used in the current specification are provided for a better understanding of the invention and should thus be construed as having a meaning and definition relevant to the technical idea of the invention.

The invention will now be described more fully with reference to the accompanying drawings, in which exemplary embodiments of the invention are shown.

Figure 1:
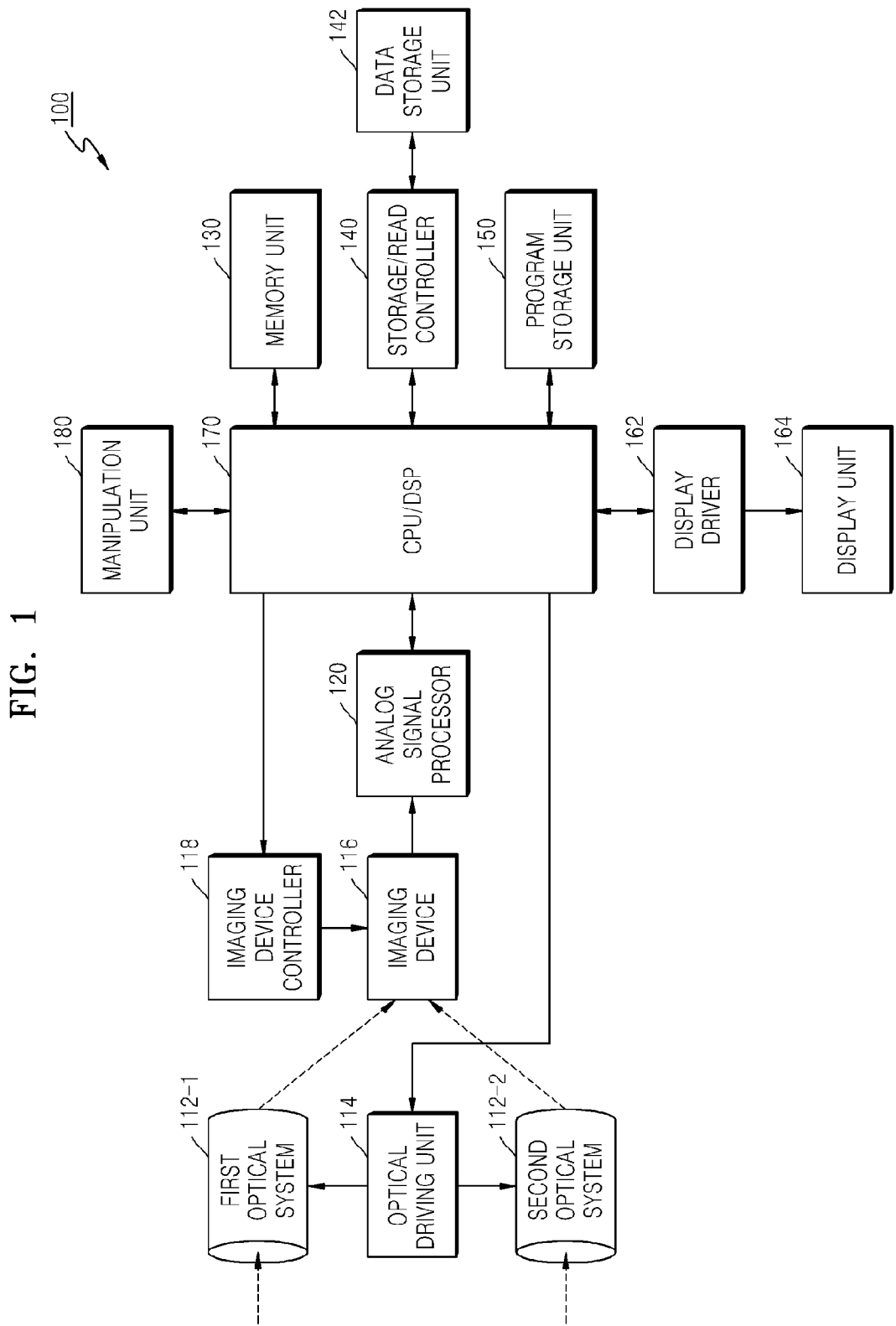
FIG. 1 is a schematic block diagram of a digital photographing apparatus according to an embodiment of the present invention.

FIG. 1 is a schematic block diagram of a digital photographing apparatus 100 according to an embodiment of the invention. The digital photographing apparatus 100 includes at least two optical systems to which an optical signal is supplied in the same direction. Although FIG. 1 illustrates that the digital photographing apparatus 100 includes two optical systems, i.e., first and second optical systems 112-1 and 112-2, the invention is not limited thereto and may be applied to digital photographing apparatuses having more than two optical systems.

Referring to FIG. 1, the digital photographing apparatus 100 includes the first optical system 112-1, the second optical system 112-2, an optical driving unit 114, an imaging device 116, an imaging device controller 118, an analog signal processor 120, a memory unit 130, a storage/read controller 140, a data storage unit 142, a program storage unit 150, a display driver 162, a display unit 164, a central processing unit/digital signal processor (CPU/DSP) 170, and a manipulation unit 180.

The overall operation of the digital photographing apparatus 100 is controlled by the CPU/DSP 170. The CPU/DSP 170 supplies a control signal for operating the optical driving unit 114, the imaging device controller 118, and so on.

Figure 2:
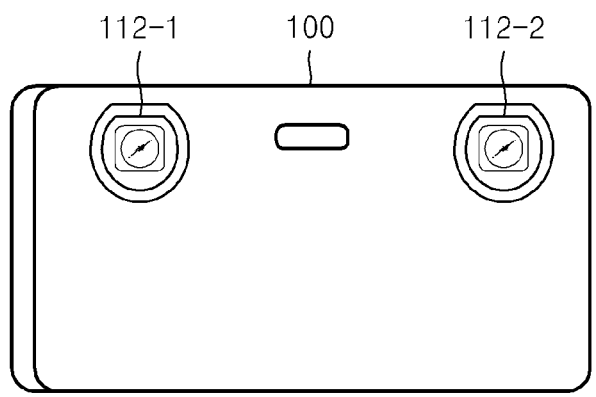
FIGS. 2 and 3 illustrate an external look of a digital photographing apparatus according to an embodiment of the invention.

Each of the first and second optical systems 112-1 and 112-2 focuses an optical signal from a subject on a light-receiving surface of the imaging device 116. Although not shown, each of the first and second optical systems 112-1 and 112-2 may include an aperture, a zoom lens, a focus lens, a mirror, a prism, and the like. The first and second optical systems 112-1 and 112-2 may have the same structure as each other or may have different structures from each other. According to an embodiment of the invention, as illustrated in FIG. 2, the first and second optical systems 112-1 and 112-2 are disposed in such a way that an optical signal is supplied thereto in the same direction. If the first and second optical systems 112-1 and 112-2 are used to obtain a three-dimensional (3D) image, optical axes of the first and second optical systems 112-1 and 112-2 may be disposed parallel to and apart from each other as illustrated in FIG. 2. In this case, two similar optical signals are supplied to the first and second optical systems 112-1 and 112-2, respectively.

The optical driving unit 114 drives the first and second optical systems 112-1 and 112-2. The optical driving unit 114 may control the degree of openness of the apertures of the first and second optical systems 112-1 and 112-2 and may adjust the location of the zoom lens and the focus lens thereof. The optical driving unit 114 may drive the first and second optical systems 112-1 and 112-2 according to a control signal received from the CPU/DSP 170. Although one optical driving unit 114 drives both the first and second optical systems 112-1 and 112-2 in FIG. 1, two optical driving units may be installed to separately drive the first and second optical systems 112-1 and 112-2.

Optical signals passing through the first and second optical systems 112-1 and 112-2 are focused on the light-receiving surface of the imaging device 116 to form an image of a subject. The imaging device 116 may be a charge-coupled device (CCD) image sensor or a complementary metal oxide semiconductor image sensor (CIS) that transforms an optical signal into an electrical signal. The sensitivity of the imaging device 116 may be controlled by the imaging device controller 118. The imaging device controller 118 may control the imaging device 116 according to either a control signal that is generated automatically according to an image signal input in real time or a control signal that is input directly by a user.

If optical signals passing through the first and second optical systems 112-1 and 112-2, respectively, are captured using one imaging device 116 as illustrated in FIG. 1, then the optical signals are focused on the imaging surface of the imaging device 116 by controlling the path of the optical signals via the mirror and/or prism included in each of the first and second optical systems 112-1 and 112-2. The optical signals received from the first optical system 112-1 and the second optical system 112-2 are captured alternatively by the imaging device 116 to capture a first image and a second image.

In another embodiment of the invention, a first imaging device that receives an optical signal passing through the first optical system 112-1 and a second imaging device that captures an optical signal passing through the second optical system 112-2 may be installed. In this case, a first image and a second image may be captured simultaneously.

An exposure time of the imaging device 116 is controlled by a shutter (not shown). Examples of the shutter include a mechanical shutter that controls an amount of incident light by moving a screen, and an electronic shutter that controls the exposure time of the imaging device 116 by supplying an electrical signal to the imaging device 116.

The analog signal processor 120 performs noise reduction, gain control, waveform shaping, and analog-to-digital conversion on an analog signal received from the imaging device 116.

A signal processed by the analog signal processor 120 may be supplied to the CPU/DSP 170 directly or via the memory unit 130. The memory unit 130 operates as a main memory unit of the digital photographing apparatus 100 and temporarily stores information needed when operating the CPU/DSP 170. The program storage unit 150 stores programs or computer readable instructions, e.g., an operating system for driving the digital photographing apparatus 100 and an application system.

The digital photographing apparatus 100 may further include the display unit 164 to display an operating state of the digital photographing apparatus 100 or information regarding an image captured by the digital photographing apparatus 100. The display unit 164 may provide a user with visual and/or audio information. In order to provide visual information, the display unit 164 may include, for example, a liquid crystal panel (LCD) or an organic light-emitting display panel. The display unit 164 may be a touch screen that senses a user's touch.

The display driver 162 supplies a driving signal to the display unit 164.

The CPU/DSP 170 processes a received image signal and controls the other constitutional elements of the digital photographing apparatus 100 according to the image signal or an external input signal. The CPU/DSP 170 may perform image signal processing on received image data, e.g., noise reduction, gamma correction, color filter array interpolation, color matrix processing, color correction, and color enhancement, in order to improve image quality. The CPU/DSP 170 may also generate an image file by compressing image data obtained through image signal processing, and reconstruct the image data from the image file. Here, the image data may be compressed by using reversible compression or irreversible compression. For example, a still image may be transformed into a Joint Photographic Experts Group (JPEG) format or a JPEG 2000 format. Also, in order to record a moving picture, a moving picture file may be generated by compressing a plurality of frames according to Moving Picture Experts Group (MPEG) standards.

Image data output from the CPU/DSP 170 is supplied to the storage/read controller 140 directly or via the memory unit 130. The storage/read controller 140 stores the image data in the data storage unit 142 according to a signal received from a user or automatically. Also, the storage/read controller 140 may read data related to an image based on an image file stored in the data storage unit 142 and supply the result of reading to the display driving unit 162 via the memory unit 130 or another path so that the image may be displayed on the display unit 164. The data storage unit 142 may be detachable from or be fixedly installed in the digital photographing apparatus 100.

The CPU/DSP 170 may also perform sharpness adjustment, color processing, blurring processing, edge enhancement, image interpretation, image recognition, e.g., face recognition and scene recognition, and image effect processing. Furthermore, the CPU/DSP 170 may perform image signal processing on an image signal corresponding to an image to be displayed on the display unit 164. For example, the CPU/DSP 170 may perform brightness control, color correction, contrast control, edge enhancement, image division, character image generation, and image synthesizing. The CPU/DSP 170 may be connected to an external monitor so as to display a result of the image signal processing on the external monitor. The CPU/DSP 170 may execute computer readable instructions or a program stored in the program storage unit 150. The CPU/DSP 170 may include an additional module to generate a control signal for controlling auto focusing, zooming, focusing, and automatic exposure and to supply the control signal to the optical driving unit 114, and the imaging device controller 118. The CPU/DSP 170 may also perform overall control of the elements of the digital photographing apparatus 100, e.g., the shutter and a flash.

A user may input a control signal via the manipulation unit 180. The manipulation unit 180 may include various function buttons, such as a shutter-release button to supply a shutter-release signal for exposing the imaging device 116 to light for a predetermined time in order to capture an image, a power button to supply a control signal for powering on or off the digital photographing apparatus 100, a wide angle-zoom button and a telephoto-zoom button for widening or narrowing a viewing angle, a mode selection button for selecting a character input mode, a shooting mode, or a play mode, a white balance setting button, and an exposure setting button. The type of the manipulation unit 180 is not limited and may be, for example, a button unit, a keyboard, a touch pad, a touch screen, or a remote controller, via which a user may input a control signal.

Figure 3:
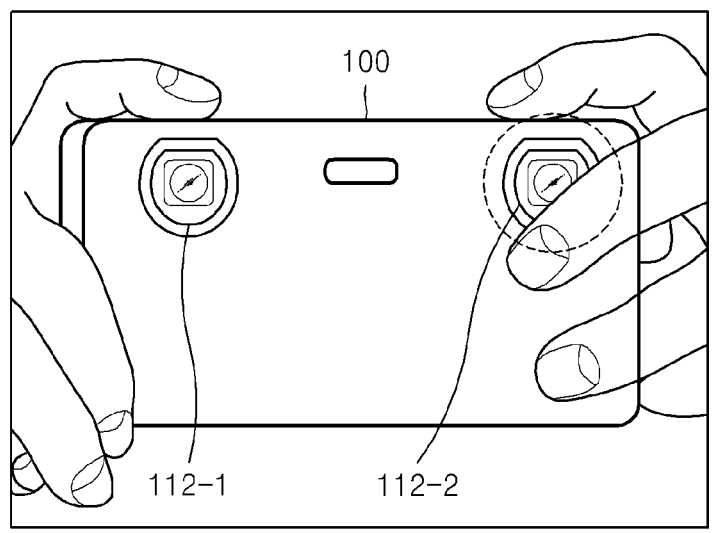

In an embodiment of the invention, the digital photographing apparatus 100 may compare a first image captured by the first optical system 112-1 with a second image captured by the second optical system 112-2, determine whether an obstacle is present on the first optical system 112-1 or the second optical system 112-2, and provide the result of determining to a user. For example, a part of the second optical system 112-2 may be covered by a finger of a user, or there may be a fingerprint of a user on a surface of a lens of the second optical system 112-2, as illustrated in FIG. 3. If an obstacle is present on the first or second optical system 112-1 or 112-2, then an image of the obstacle, e.g., fingerprints or fingers of the user, is captured when an image of a subject is captured and the image of the subject may thus be blurry or the quality of the image may be degraded. According to embodiments of the invention, the first and second images are compared with each other so as to determine whether an obstacle was present when the first and second images were captured.

Figure 4:
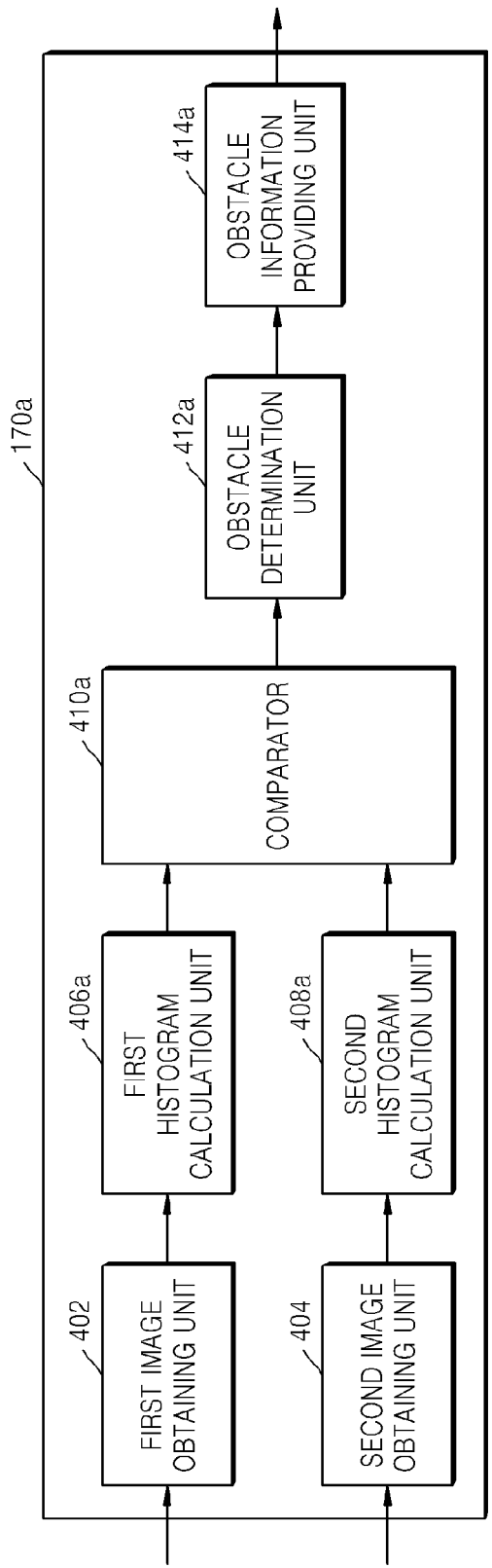
FIG. 4 is a block diagram of a central processing unit/digital signal processor (CPU/DSP) according to an embodiment of the invention.

FIG. 4 is a block diagram of a CPU/DSP 170a according to an embodiment of the invention. Referring to FIG. 4, the CPU/DSP 170a includes a first image obtaining unit 402, a second image obtaining unit 404, a first histogram calculation unit 406a, a second histogram calculation unit 408a, a comparator 410a, an obstacle determination unit 412a, and an obstacle information providing unit 414a.

The first image obtaining unit 402 obtains a first image captured from an optical signal passing through the first optical system 112-1 of FIG. 1, and the second image obtaining unit 404 obtains a second image captured from an optical signal passing through the second optical system 112-2 of FIG. 1. The first image and second image may be captured images or live view images. If they are live view images, whether an obstacle is present may be determined continuously and the result of determining may be supplied to a user during a shooting mode.

The first histogram calculation unit 406a calculates a first histogram from the first image, and the second histogram calculation unit 408a calculates a second histogram from the second image. The first histogram represents a frequency distribution according to the values of pixels in the first image, and the second histogram represents a frequency distribution according to the values of pixels in the second image. The values of the pixels may be, for example, a brightness Y of an image in an YCbCr format. The first and second histograms may be calculated based on all of the first and second images or may be calculated on a block basis by calculating the first and second histograms in units of blocks.

The comparator 410a compares the first and second histograms with each other and provides the result of comparing to the obstacle determination unit 412a. According to an embodiment of the invention, the comparator 410a may calculate a third histogram representing absolute values of differences between the values of the first and second histograms. Methods of calculating such a third histogram according to embodiments of the invention will be described with reference to FIGS. 5A, 5B and 6A, 6B.

Figure 5A:
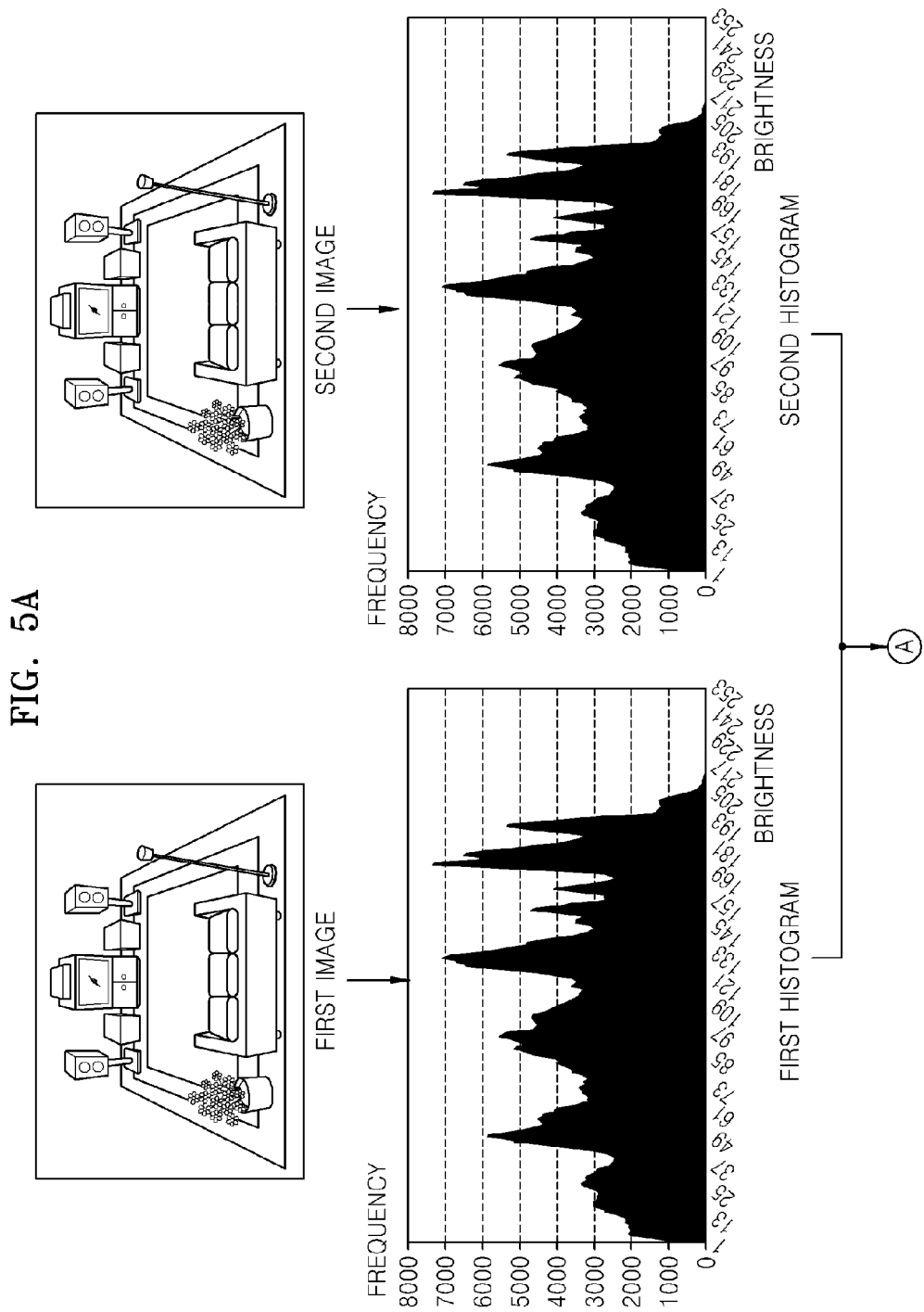
FIGS. 5A and 5B illustrate a process of calculating first to third histograms from first and second images when an obstacle does not exist, according to an embodiment of the invention.
Figure 5B:
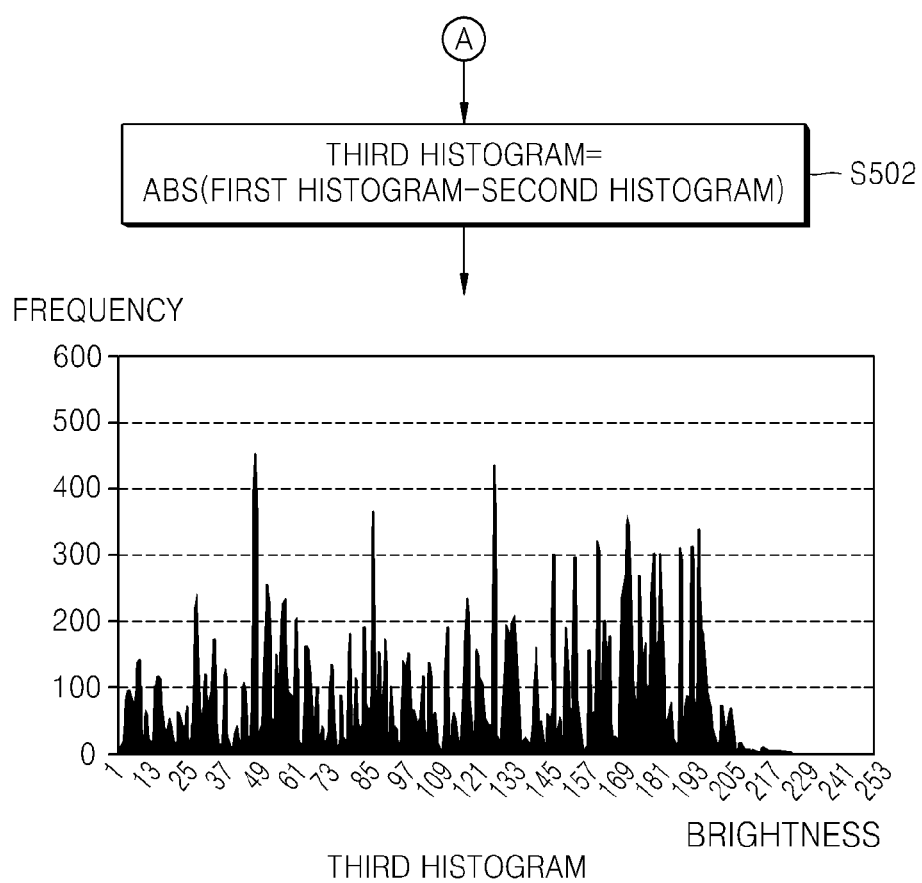

FIGS. 5A and 5B illustrate a process of calculating a first histogram, a second histogram, and a third histogram from a first image and a second image when an obstacle does not exist, according to an embodiment of the invention. First, the first histogram is calculated from the first image, and the second histogram is calculated from the second image. Then, the third histogram is calculated by calculating absolute values of differences between the values of the first histogram and the values of the second histogram (operation S502). If an image of an obstacle is not included in either the first image or the second image as illustrated in FIGS. 5A and 5B, then the first image and the second image are fairly identical to each other and most of the values of the third histogram are relatively small. Specifically, referring to FIGS. 5A and 5B, most of the values of the first histogram and the second histogram are a frequency of 3000 or more but most of the values of the third histogram are a frequency of 200 or less.

Figure 6B:
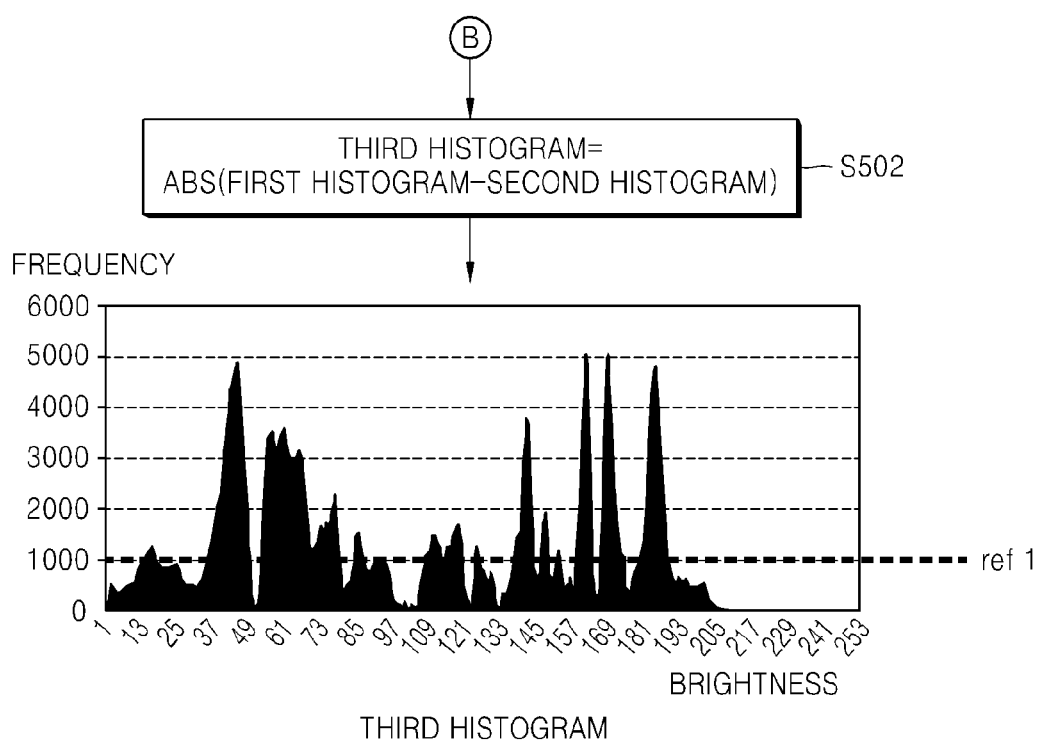

FIGS. 6A and 6B illustrate a process of calculating a first histogram, a second histogram, and a third histogram from a first image and a second image when an obstacle exists on the second optical system 112-2 of FIG. 1, according to an embodiment of the invention. Referring to FIG. 6A, a fingerprint of a user is left as an obstacle on a lens of the second optical system 112-2. If such an obstacle is present on the first or second optical system 112-1 or 112-2, then most of the values of the third histogram are relatively large.

Referring back to FIG. 4, the obstacle determination unit 412a determines whether an obstacle is present on the first or second optical system 112-1 or 112-2, based on the result of comparing received from the comparator 410a. If the comparator 410a calculates the third histogram, then the obstacle determination unit 412a determines whether an obstacle is present on the first or second optical system 112-1 or 112-2, based on the third histogram. For example, whether a representative value of the third histogram is greater than a first reference value Ref1 may be determined (see the third histogram illustrated in FIG. 6B), and then it may be determined that an obstacle is present when the representative value of the third histogram is greater than the first reference value Ref1.

The representative value of the third histogram may be determined in any of various ways. For example, whether an obstacle is present may be determined based on an average value of the third histogram. As another example, an integral of values of the third histogram that are greater than the first reference value Ref1 may be calculated, and it may be determined that an obstacle is present when the integral is greater than a second reference value.

The first reference value Ref1 may be a predetermined value or may vary according to shooting conditions. For example, the shorter a focal distance, the greater the first reference value Ref1, and the greater the focal distance, the smaller the first reference value Ref1. As another example, the higher a resolution, the greater the first reference value Ref1. If the first to third histograms are calculated on a block basis, the first reference value Ref1 may vary according to the size of a unit block.

The obstacle information providing unit 414a provides a user with information indicating whether an obstacle is present. This information may be provided by the display unit 164 as a visual message or a sound message or may be provided by turning on a light-emitting diode LED.

Figure 7:
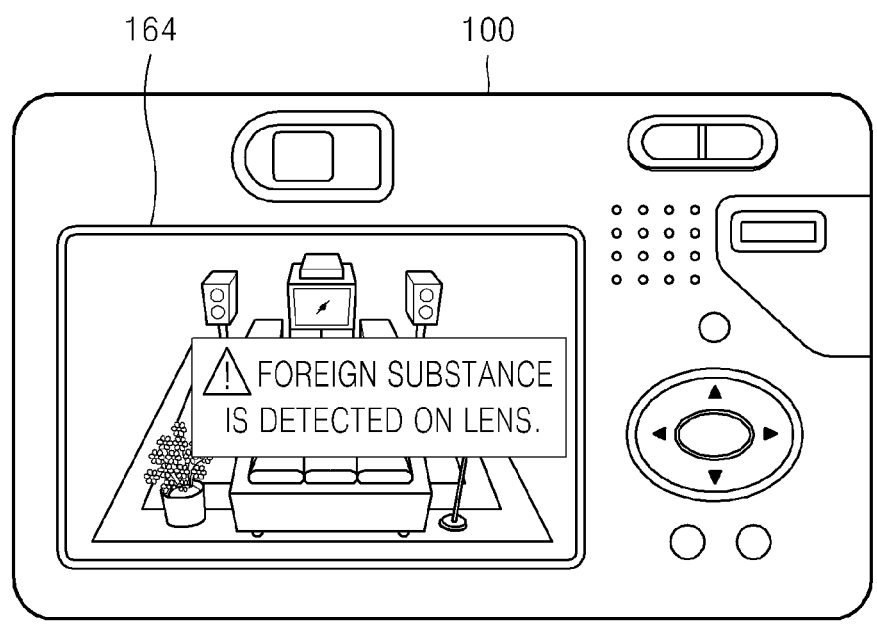
FIG. 7 illustrates a screen image displaying information indicating that an obstacle exists, according to an embodiment of the invention.

FIG. 7 illustrates a screen image displaying information indicating that an obstacle exists, according to an embodiment of the invention. Referring to FIGS. 1, 4, and 7, if the obstacle determination unit 412a determines that an obstacle is present on the first or second optical system 112-1 or 112-2, then a message indicating this fact may be provided to a user via the display unit 164.

Figure 8:
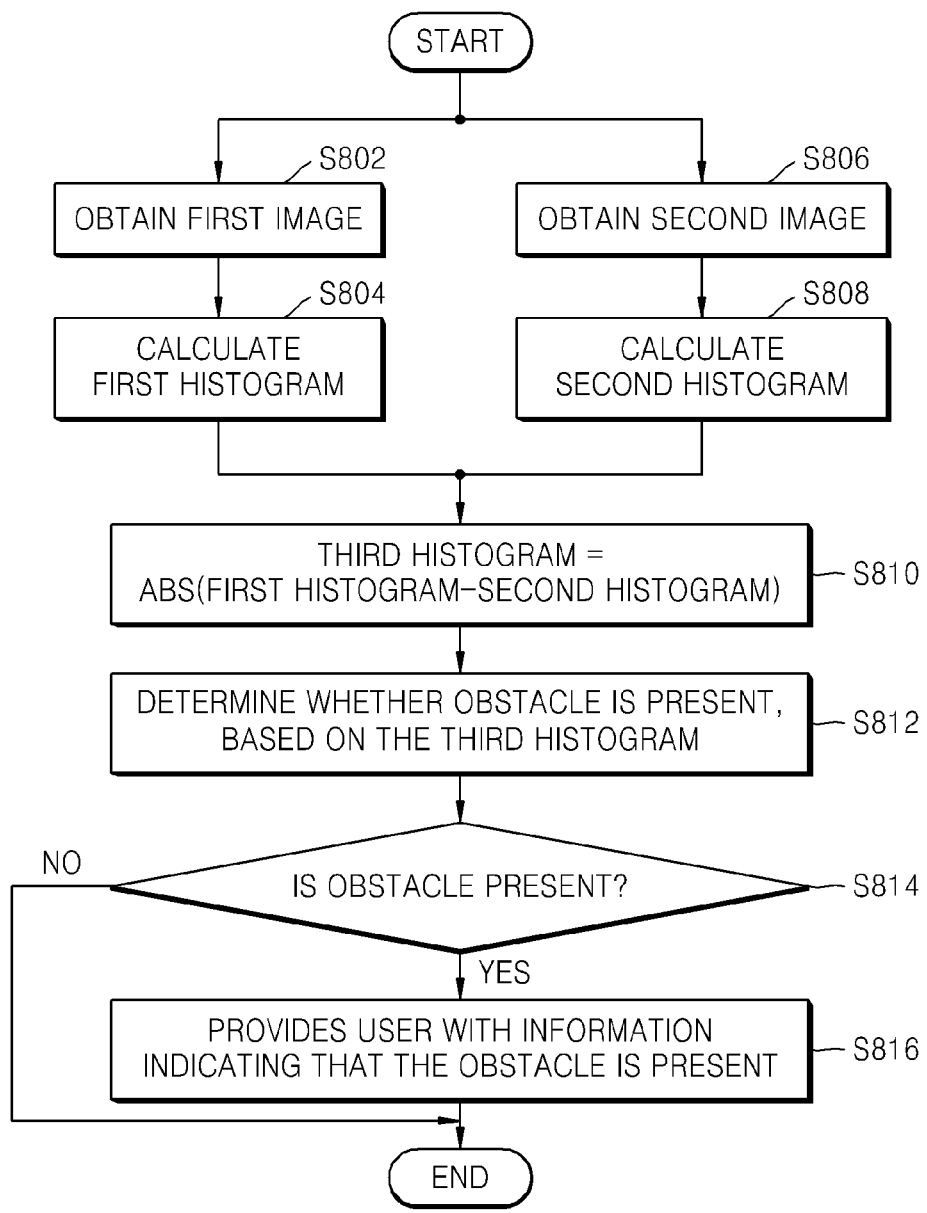
FIG. 8 is a flowchart illustrating a method of controlling the digital photographing apparatus of FIG. 1, according to an embodiment of the invention.

FIG. 8 is a flowchart illustrating a method of controlling the digital photographing apparatus 100 of FIG. 1, according to an embodiment of the invention. Referring to FIGS. 1, 4, and 8, first, the first image obtaining unit 402 obtains a first image from an optical signal passing through the first optical system 112-1 (operation S802), and the second image obtaining unit 404 obtains a second image from an optical signal passing through the second optical system 112-2 (operation S806). Next, the first histogram calculation unit 406a calculates a first histogram from the first image (operation S804), and the second histogram calculation unit 408a calculates a second histogram from the second image (operation S808). If the first and second histograms are calculated, then the comparator 410a calculates a third histogram therefrom (operation S810). Next, the obstacle determination unit 412a determines whether an obstacle is present, based on the third histogram (operation S812). If it is determined that an obstacle is present (operation S814), the obstacle information providing unit 414a provides a user with information indicating that an obstacle is present (operation S816).

Figure 9:
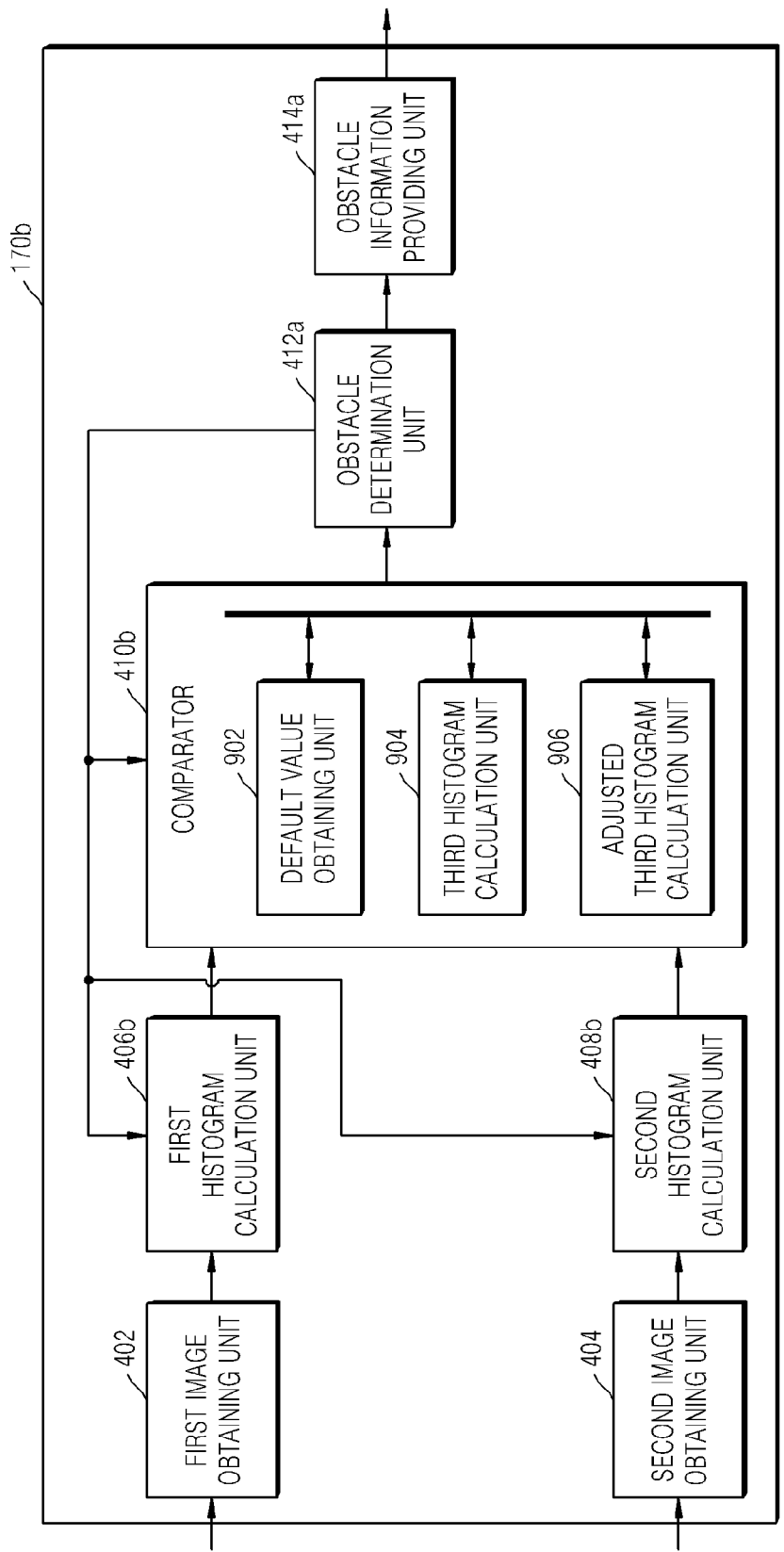
FIG. 9 is a block diagram of a CPU/DSP according to another embodiment of the invention.
Figure 10:
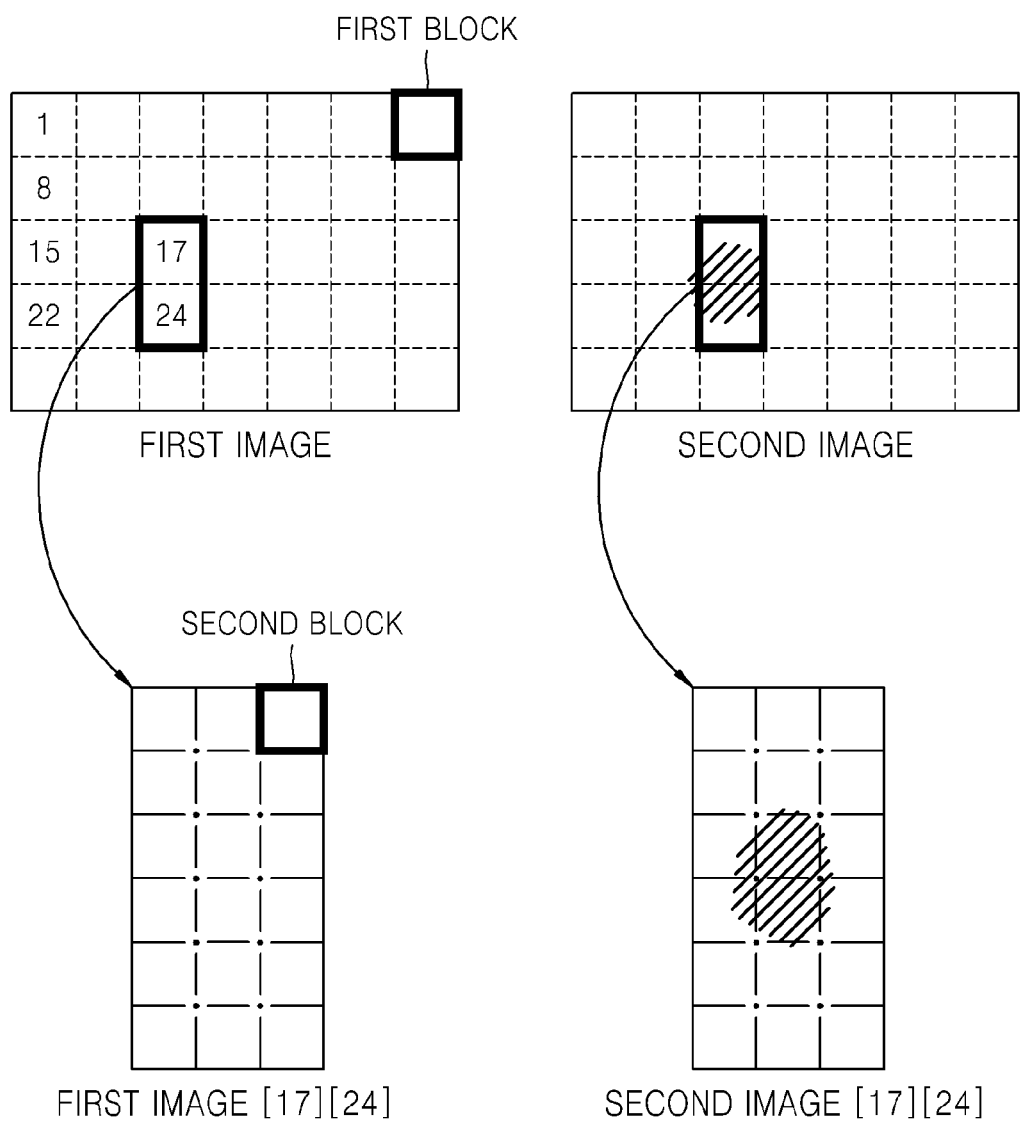
FIG. 10 illustrates a method of determining whether an image of an obstacle is present in a first or second image, according to an embodiment of the invention.

FIG. 9 is a block diagram of a CPU/DSP 170b according to another embodiment of the invention. FIG. 10 illustrates a method of determining whether an image of an obstacle is present in a first or second image, according to an embodiment of the invention.

According to an embodiment of the invention, first to third histograms may be calculated on a block basis, whether an obstacle is present may also be determined on a block basis, and location information of a block on which an obstacle is present may be provided to a user. According to another embodiment of the invention, a default value of a third histogram may be determined according to shooting conditions and then the default value may be removed from each of the values of the third histogram.

Referring to FIG. 9, the CPU/DSP 170b includes a first image obtaining unit 402, a second image obtaining unit 404, a first histogram obtaining unit 406b, second histogram obtaining unit 408b, a comparator 410b, an obstacle determination unit 412b, and an obstacle information providing unit 414b. The comparator 410b includes a default value obtaining unit 902, a third histogram calculation unit 904, and an adjusted third histogram calculation unit 906.

In the current embodiment, the first histogram obtaining unit 406b and the second histogram obtaining unit 408b obtain the first and second histograms in units of first blocks of first and second images, respectively. The first blocks may be defined as illustrated in FIG. 10, and the first and second histograms are calculated sequentially in units of the first blocks.

The default value obtaining unit 902 obtains a default difference value for the third histogram according to shooting conditions. The default difference value may be determined by at least one selected from the group consisting of focal lengths of the first and second optical systems 112-1 and 112-2, the types of the lenses of the first and second optical systems 112-1 and 112-2, an angle between the optical axes of the first and second optical systems 112-1 and 112-2, and the type of the imaging device 116. The same default difference value may be allocated to all the values of pixels of the third histogram. Otherwise, the default difference value may vary according to the value of a pixel, that is, may be represented in the form of a histogram.

The optical axes of the first and second optical systems 112-1 and 112-2 are disposed apart from each other, and thus, differences between first and second images become greater as the focal distance between the first and second optical systems 112-1 and 112-2 becomes shorter. Thus, the shorter the focal distance between the first and second optical systems 112-1 and 112-2, the greater the default difference value may be.

In general, when an image is captured by using a lens, the captured image is accompanied by an optical error, such as a spherochromatism, a longitudinal chromatic aberration, or a lateral chromatic aberration. Such an optical error causes the first and second images to not be identical to each other. Thus, the default difference value varies according to the types of the lenses of the first and second optical systems 112-1 and 112-2.

The first and second optical systems 112-1 and 112-2 may be manufactured in such a way that the distance between the optical axes thereof may be controlled. In this case, the default difference value may vary according to an angle between the optical axes of the first and second optical systems 112-1 and 112-2.

Also, characteristics of the first and second images, e.g., noise levels thereof, may vary according to the type of the imaging device 116, and the default difference value may thus vary according to the type of the imaging device 116.

The third histogram calculation unit 904 calculates a third histogram from the first and second histograms. The third histogram represents absolute values of differences between the values of the first and second histograms according to the values of pixels. The third histogram may also be calculated in units of the first blocks.

The adjusted third histogram calculation unit 906 calculates the third histogram by removing the default difference value from each of the values of the third histogram.

The obstacle determination unit 412b determines whether an obstacle is present in units of the first blocks. If an obstacle is present on a current first block, then the obstacle determination unit 412b stores location information of the current first block. Then, the obstacle determination unit 412b supplies a control signal to the first histogram obtaining unit 406b, the second histogram obtaining unit 408b, and the comparator 410b to move onto a next first block. As described above, the operations of the first and second histogram obtaining units 406b and 408b, the comparator 410b, and the obstacle determination unit 412b are performed repeatedly until determination as to whether an obstacle is present is performed on all the first blocks.

According to another embodiment of the invention, in the digital photographing apparatus 100, when an obstacle is present on a first block from among a plurality of first blocks, the obstacle information providing unit 414b may provide a user with location information of the first block on which the obstacle is present and may then stop the determination from being done on remaining first blocks.

According to another embodiment of the invention, the location of an obstacle may be detected more precisely and the result of detecting may be provided to a user. To this end, after having determined whether an obstacle exists with respect to each first block of the first and second images, if a first block on which an obstacle is present is detected, then the obstacle determination unit 412b controls the first and second histogram obtaining units 406b and 408b and comparator 410b to determine whether an obstacle is present in units of second blocks that are smaller than the first block on which the obstacle is present. For example, referring to FIG. 10, if an obstacle is present on a $17^{th}$ first block and a $24^{th}$ first block of either of first or second images, then the obstacle determination unit 412b controls the first and second histogram obtaining units 406b and 408b and the comparator 410b to calculate first to third histograms from a first sub image [17][24] and a second sub image [17][24] that correspond to the $17^{th}$ and $24^{th}$ first blocks in units of second blocks, and determines where the obstacle is present in units of the second blocks. The second blocks are smaller than each of the $17^{th}$ and $24^{th}$ first blocks. As described above, if first blocks on which an obstacle is present are divided into a plurality of sub blocks and where the obstacle is present is determined in units of the sub blocks, then the location of the obstacle may be detected more precisely and the result of detecting may be provided to a user.

Figure 11:
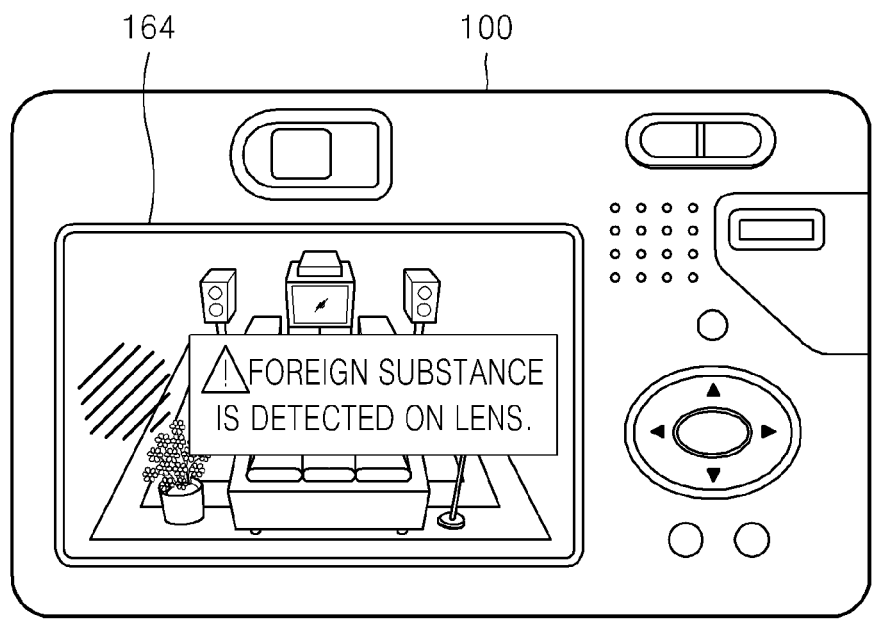
FIG. 11 illustrates a screen image displaying location information of an obstacle, according to an embodiment of the invention.

FIG. 11 illustrates a screen image displaying location information of an obstacle, according to an embodiment of the invention. Referring to FIGS. 4 and 11, the obstacle information providing unit 414b may display the location of an obstacle and provide a user with a message indicating the presence of the obstacle.

Figure 12:
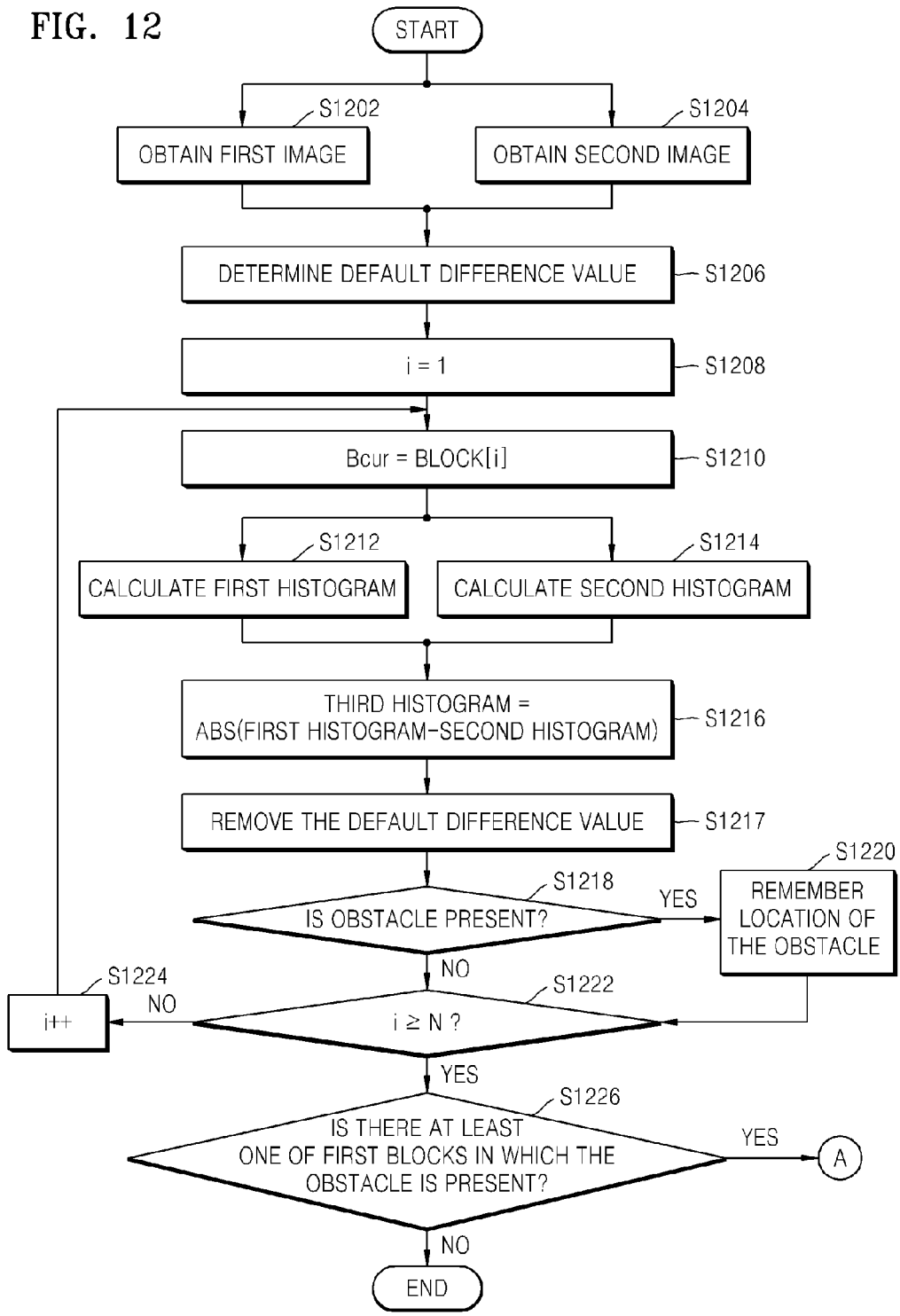

FIGS. 12 and 13 are flowcharts illustrating a method of controlling a digital photographing apparatus, according to another embodiment of the invention. First, referring to FIGS. 1, 4, 12 and 13, the first image obtaining unit 402 obtains a first image from an optical signal passing through the first optical system 112-1 (operation S1202), and the second image obtaining unit 404 obtains a second image from an optical signal passing through the second optical system 112-2 (operation S1204). Next, the default value obtaining unit 902 determines a default difference value according to shooting conditions (operation S1206). As described above, the default difference value may be determined by at least one selected from the group consisting of focal lengths of the first and second optical systems 112-1 and 112-2, the types of the lenses of the respective first and second optical systems 112-1 and 112-2, an angle between the optical axes of the first and second optical systems 112-1 and 112-2, and the type of the imaging device 116.

Next, whether an obstacle is present is determined in units of first blocks of the first and second images. To this end, a variable i representing the location of a current first block Bcur is initialized, e.g., having an initial value of '1' (operation S1208). Next, the current first block Bcur is set as an $i^{th}$ first block BLOCK[i] (operation S1210), and first and second histograms are calculated based on the current first block Bcur (operations S1212 and S1214). After the first and second histograms are calculated, a third histogram is calculated therefrom (operation S1216). Then, an adjusted third histogram is calculated by removing the default difference value from each of the values of the third histogram (operation S1217). Then, whether an obstacle is present in the current first block Bcur is determined based on the adjusted third histogram (operation S1218). If it is determined in operation S1218 that an obstacle is present, then the location of the current first block Bcur, i.e., the variable i, is stored (operation S1220). Next, it is determined whether the current first block Bcur is a last block from among the first blocks (operation S1222). If it is determined in operation S1222 that the current first block Bcur is not the last block, then a next first block is selected so as to perform operations S1210 to S1220 thereon (operation S1224). If it is determined in operation S1222 that the current first block Bcur is the last block, then it is determined whether it had been determined that there is a first block on which an obstacle (operation S1226). If it is determined in operation S1226 that there is a first block in which an obstacle is present, then this first block is divided into second blocks and the above operations are performed again in units of the second blocks in order to determine where the obstacle is present.

Specifically, if it is determined in operation S1226 that there is at least one first block in which an obstacle is present, then the at least one first block is divided into second blocks (operation S1302). Next, a first sub image and a second sub image corresponding to the at least one first block are obtained (operations S1304 and S1306). To this end, either parts of the first and second images that correspond to the at least one first block may be stored separately or the first and second images and the coordinates of the at least one first block may be used.

Next, the default difference value is adjusted since the second blocks which are current units of processing are smaller than the first blocks (operation S1308). A variable j indicating the location of a current second block B2cur is initialized, e.g., having an initial value of '1' (operation S1310). Next, the current second block B2cur is set as a $j^{th}$ second block BLOCK[j] (operations S1312), and first and second histograms are calculated based on the current second block B2cur (operations S1314 and S1316). After the first and second histograms are calculated, a third histogram is calculated therefrom (operation S1318). Then, an adjusted third histogram is calculated by removing the default difference value from (each of the values of) the third histogram (operation S1319). Then, it is determined whether the obstacle is in the current second block B2cur, based on the adjusted third histogram (operation S1320). If it is determined in operation S1320 that the obstacle is present, then the location of the current second block B2cur, i.e., the variable j, is stored (operation S1322). Next, it is determined whether the current second block B2cur is a last block from among the second blocks (operation S1324). If it is determined in operation S1324 that the current second block B2cur is not the last block, then a next second block is selected so as to perform operations S1312 to S1322 thereon (operation S1326). If it is determined in operation S1324 that the current second block B2cur is the last block, then the location information of the obstacle is provided to a user (operation S1328).

The invention may be embodied as computer readable code in a computer readable medium. Here, the computer readable medium may be any recording apparatus capable of storing data that is read by a computer system. The computer readable medium may be limited to non-transitory computer readable medium.

The computer readable code may be embodied in such a way that the operations of a method of controlling a digital photographing apparatus according to an embodiment of the invention are performed when the computer readable code is read from the computer readable medium and is executed via the CPU/DSP 170 of FIG. 1. The computer readable code may be embodied in any of various programming languages. A functional program, code, and code segments for performing the above embodiments of the invention may be programmed easily by those of ordinary skill in the art.

Examples of the computer readable medium include a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the invention may be stored and implemented as computer readable code in the distributed system.

According to the above embodiments of the invention, it is possible to determine whether an obstacle is present on at least one optical system of a digital photographing apparatus that includes at least two optical systems, thereby preventing a subject from being photographed while being covered by the obstacle.

Also, according to the above embodiments of the invention, it is possible to inform a user of the location and presence of an obstacle if any, so that the user can remove the obstacle before photographing.

The functionality associated with describing embodiments of the invention is described with a number of illustrative units. However, the units may be differently arranged so that the functionality of a single unit may be implemented with two or more units and the functionality of two or more units may be combined into a single unit. Moreover, the functionality may be differently arranged between illustrative units.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of controlling a digital photographing apparatus that includes a first optical system and a second optical system disposed on different optical axes and allowing light to pass therethrough, the method comprising:
   obtaining a first image captured from an optical signal received via the first optical system;
   obtaining a second image captured from an optical signal received via the second optical system;
   calculating a first histogram from the first image, where the first histogram represents a frequency distribution according to values of pixels of the first image;
   calculating a second histogram from the second image, where the second histogram represents a frequency distribution according to values of pixels of the second image;
   comparing the first histogram and the second histogram with each other; and
   determining whether an obstacle is present on at least one of the first and second optical systems, based on the result of comparison.

2. The method of claim 1, wherein the values of the pixels indicate brightness.

3. The method of claim 1, further comprising: if an obstacle is present on at least one of the first and second optical systems, informing a user that an obstacle is present.

4. The method of claim 1, wherein the comparing of the first histogram and the second histogram with each other comprises calculating a third histogram by calculating absolute values of differences between values of the first and second histograms, and
   the determining of whether an obstacle is present comprises determining whether an obstacle is present on at least one of the first and second optical systems, based on the third histogram.

5. The method of claim 4, wherein the determining of whether an obstacle is present comprises determining whether an obstacle is present by determining whether a representative value of the third histogram is greater than a first reference value.

6. The method of claim 4, wherein the determining of whether an obstacle is present comprises determining that an obstacle is present when an integral of values of the third histogram that are greater than a first reference value is greater than a second reference value.

7. The method of claim 5, further comprising determining the first reference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution.

8. The method of claim 1, wherein the comparing of the first histogram and the second histogram with each other comprises:
   determining a default difference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution;
   calculating a third histogram from the values of the pixels of the first and second images, where the third histogram represents absolute values of differences between values of the first and second histograms; and
   calculating an adjusted third histogram by removing the default difference value from the values of the third histogram,
   wherein the determining of whether an obstacle is present comprises determining whether an obstacle is present on at least one of the first and second optical systems, based on the adjusted third histogram.

9. The method of claim 1, wherein the calculating of the first histogram, the calculating of the second histogram, the comparing of the first histogram and the second histogram with each other, and the determining of whether an obstacle is present are performed in units of first blocks of the first and second image, and
   the method further comprising, if an obstacle is present, providing a user with location information of an obstacle by providing the user with location information of at least one of the first blocks in which an obstacle is present.

10. The method of claim 9, wherein, if an obstacle is present, the first and second histograms are calculated from the at least one first block in units of second blocks, the first and second histograms are compared with each other, and whether an obstacle is present on at least one of the first and second optical systems is determined based on the result of comparison, where the second blocks are smaller than the at least one first block, and the providing a user with location information of an obstacle provides the user with location information of at least one of the second blocks in which an obstacle is present.

11. A digital photographing apparatus comprising:
a first optical system and a second optical system disposed on different optical axes and allowing light to pass therethrough;
at least one imaging device configured to transform optical signals passing respectively through the first and second optical systems into electrical signals;
a first image obtaining unit configured to obtain a first image captured from the optical signal received via the first optical system;
a second image obtaining unit configured to obtain a second image captured from the optical signal received via the second optical system;
a first histogram calculation unit configured to calculate a first histogram from the first image, where the first histogram represents a frequency distribution according to values of pixels of the first image;
a second histogram calculation unit configured to calculate a second histogram from the second image, where the second histogram represents a frequency distribution according to value of pixels of the second image;
a comparison unit configured to compare the first histogram and the second histogram with each other; and
an obstacle determination unit configured to determine whether an obstacle is present on at least one of the first and second optical systems, based on the result of comparison.

12. The digital photographing apparatus of claim 11, wherein the values of the pixels indicate brightness.

13. The digital photographing apparatus of claim 11, further comprising an obstacle information providing unit configured to inform a user that an obstacle is present when an obstacle is present on at least one of the first and second optical systems.

14. The digital photographing apparatus of claim 11, wherein the comparator comprises a third histogram calculation unit configured to calculate a third histogram by calculating absolute values of differences between values of the first and second histograms, and wherein
the obstacle determination unit is configured to determine whether an obstacle is present on at least one of the first and second optical systems, based on the third histogram.

15. The digital photographing apparatus of claim 14, wherein the obstacle determination unit is configured to determine whether an obstacle is present by determining whether a representative value of the third histogram is greater than a first reference value.

16. The digital photographing apparatus of claim 14, wherein the obstacle determination unit is configured to determine that an obstacle is present when an integral of values of the third histogram that are greater than a first reference value is greater than a second reference value.

17. The digital photographing apparatus of claim 15, wherein the obstacle determination unit is configured to determine the first reference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution.

18. The digital photographing apparatus of claim 11, wherein the comparator comprises:
a default value obtaining unit configured to determine a default difference value according to at least one selected from the group consisting of focal lengths of the first and second optical systems, types of lenses of the first and second optical systems, an angle between the optical axes of the first and second optical systems, a type of an imaging device included in the digital photographing apparatus, and a set resolution;
a third histogram calculation unit configured to calculate a third histogram from the values of the pixels of the first and second images, where the third histogram represents absolute values of differences between values of the first and second histograms; and
an adjusted third histogram calculation unit configured to calculate an adjusted third histogram by removing the default difference value from the values of the third histogram,
wherein the obstacle determination unit determines whether an obstacle is present on at least one of the first and second optical systems, based on the adjusted third histogram.

19. The digital photographing apparatus of claim 11, wherein operations of the first histogram calculation unit, the second histogram calculation unit, the comparator, and the obstacle determination unit are performed in units of first blocks of the first and second images, and
the digital photographing apparatus further comprising an obstacle information providing unit configured to provide a user with location information of an obstacle by providing the user with location information of at least one of the first blocks in which an obstacle is present, when an obstacle is present.

20. The digital photographing apparatus of claim 19, wherein, if an obstacle is present, the first and second histogram obtaining units calculate the first and second histograms from the at least one first block in units of second blocks divided from the at least one first block, respectively, and wherein
if an obstacle is present, the comparison unit compares the first and second histograms with each other with respect to the at least one first block in units of the second blocks, and wherein
the obstacle information providing unit is configured to provide a user with location information of at least one of the second blocks in which an obstacle is present.

* * * * *